(12) United States Patent
Gierling

(10) Patent No.: US 6,421,595 B1
(45) Date of Patent: Jul. 16, 2002

(54) METHOD TO IMPROVE THE AUTOMOTIVE STABILITY CONTROL WITH ELECTRONIC CONTROLLED CVT'S

(75) Inventor: Armin Gierling, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/650,018

(22) Filed: Aug. 28, 2000

(30) Foreign Application Priority Data

Sep. 17, 1999 (DE) .......................................... 199 44 656

(51) Int. Cl.$^7$ ................................................ G06F 7/00
(52) U.S. Cl. ........................................................ 701/51
(58) Field of Search ............................. 701/51, 57, 60, 701/61, 58, 59; 477/39, 43, 37, 38, 44; 475/72, 207, 214, 216; 476/10, 40, 41, 42, 46

(56) References Cited

U.S. PATENT DOCUMENTS 5,330,396 A * 7/1994 Lohr et al. ..................... 476/10
5,417,620 A * 5/1995 Lohr et al. ..................... 476/40
5,643,121 A * 7/1997 Greenwood et al. .......... 475/72

FOREIGN PATENT DOCUMENTS

| DE | 37 31 487 A1 | | 4/1988 |
| EP | 02 80 757 A1 | | 9/1988 |
| JP | 04169334 A | * | 6/1992 |
| JP | 4-365645 | | 12/1992 |
| JP | 08020265 A | | 1/1996 |

OTHER PUBLICATIONS

Dynamische Stabilitäts Control DSC der Baureihe 7 von BMW—Teil 1., Debes, Michael, ATZ Automobiltechnische Zeitschrift 99, 1997 3, S. 134–140; Bild 4.

* cited by examiner

Primary Examiner—Jacques H. Louis-Jacques
(74) Attorney, Agent, or Firm—Davis & Bujold, P.L.L.C.

(57) ABSTRACT

Within the scope of the method to improve the automotive stability control in connection with an automotive stability computer and with electronic CVT transmission, the change of the rotatory inertia appearing during control engagement as consequence of a change of ratio of the transmission is eliminated.

5 Claims, 2 Drawing Sheets

METHOD TO IMPROVE THE AUTOMOTIVE STABILITY CONTROL WITH ELECTRONIC CONTROLLED CVT'S

The invention relates to a method improving the automotive stability control relates to electronic continuously variable automatic transmissions (CVT).

BACKGROUND OF THE INVENTION

The purpose of automotive stability control for the vehicle is to dynamically obtain stable operating states in the physical limiting range. To that end, an automotive stability computer usually engages in the braking system by purposefully braking individual gears and/or in engine management by reduction or removal of engine torque independent of the accelerator pedal value. In the control engagement, each change of the rotary inertia of the power train connected with the gears is an undesired interference level.

This invention, therefore, is based on the problem of outlining, on the basis of the cited prior art, a method for improving automotive stability control in connection with electronic CVT transmissions.

Accordingly, it is proposed to eliminate the rotary inertia change consequently appearing from a transmission ratio change, to effectively remove a relevant interference level of the automotive stability control.

SUMMARY OF THE INVENTION

Within the scope of an advantageous embodiment, to implement the inventive method, the automotive stability computer and the electronic transmission control are coupled with each other via the CAN (controller area network) data line or a direct signal line so that a signal indicative of the active engagement of the automotive stability computer is passed on to the electronic transmission control.

Based on the principle of continuous variability, every current operation of ratio adjustment in the transmission can be event-controlled, directly changed or discontinued. It is unimportant here in what manner the variator ratio assumes the driving strategy of the vehicle/transmission (usually by means of ratio, rotational speed or output torque controls or by the CVT tip strategy to reproduce discrete ratio steps).

With detection of the active automotive stability control, according to the invention use, is made of the above cited principle and the actually existing variator ratio is "frozen" by the electronic transmission control independently of an eventually direct current adjustment so as to eliminate a change of the rotary inertia due to a change of ratio of the transmission.

When the engagement of the electronic transmission control is terminated, a transition function ensures the comfortable transfer to the "normal ratio".

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
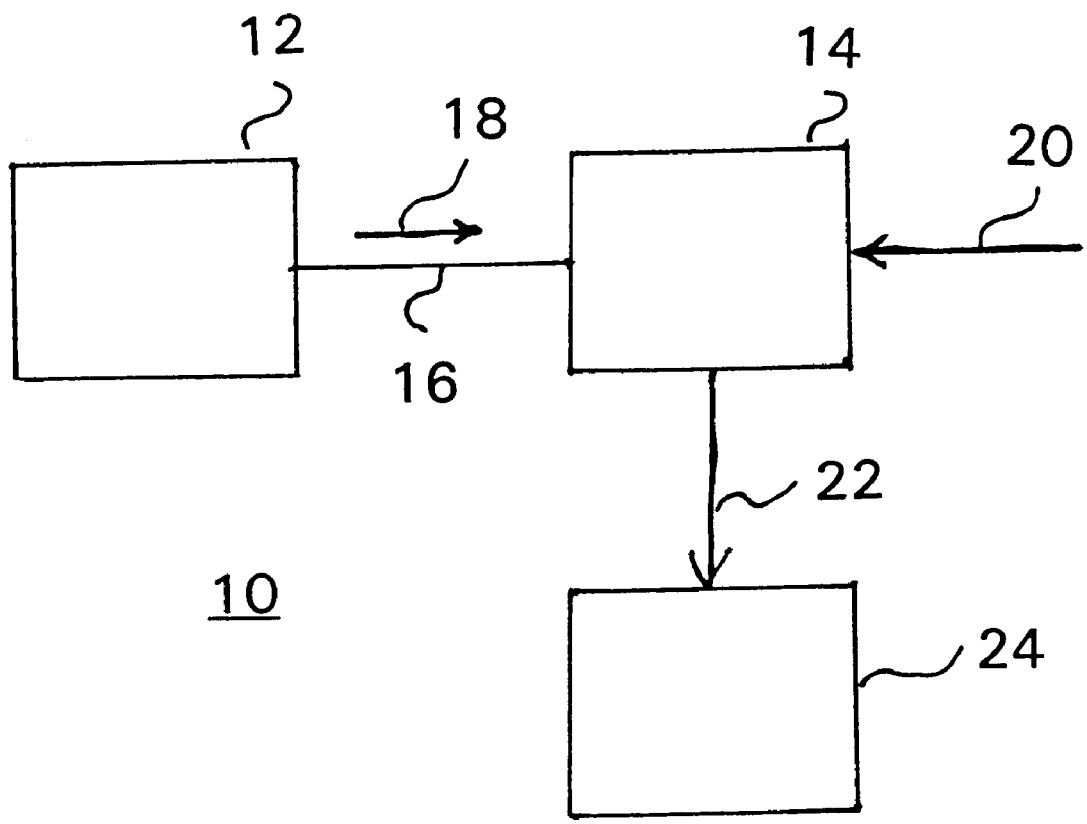
FIG. 1 is a block diagram of a CVT automotive stability system incorporating the present invention; and, FIG. 2 is a flow chart of the method to improve the automotive stability control in connection with electronic controlled CVTs.

Referring to FIG. 1, therein is shown a block diagram of an illustrative CVT Automotive Stability System 10 incorporating the present invention. As shown therein, and as described herein above, a CVT Automotive Stability System 10 includes an Automotive Stability Computer 12 and an Electronic Transmission Control 14 that are coupled with each other via a Link 16, such as the CAN (controller area network) data line or a direct signal line, so that an Engagement Signal 18 indicative of the active engagement or disengagement of the Automotive Stability Computer 12 is passed from the Automotive Stability Computer 12 to the Electronic Transmission Control 14. Electronic Transmission Control 14 also receives a Ratio Input 20 indicating a desired transmission ratio or change in transmission ratio, and in turn provides a Ratio Control Signal 22 to the Continuously Variable Transmission (CVT) 24 to control the transmission ratio of the CVT 24 according to the method described below with reference to FIG. 2.

Figure 2:
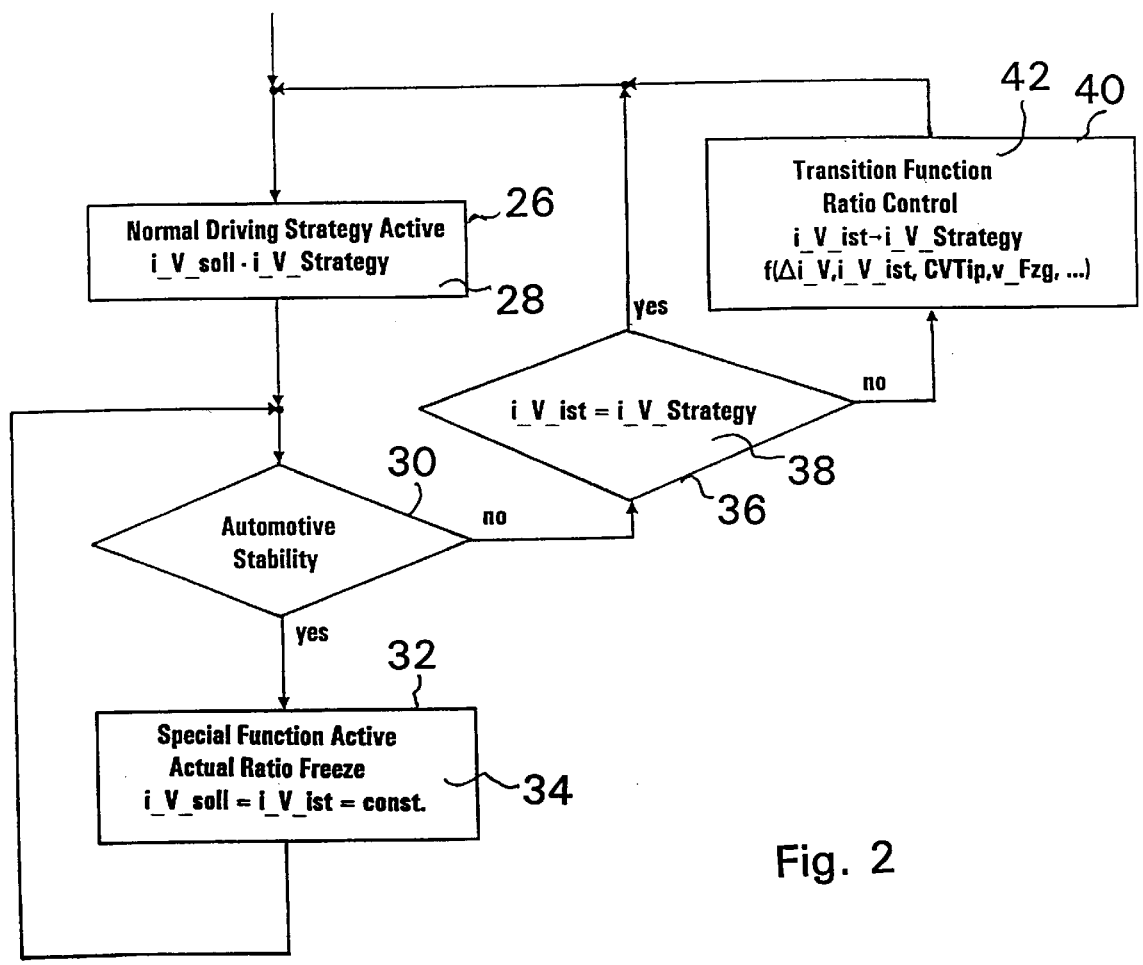

Referring to FIG. 2, the method of the present invention is invoked upon the occurrence of a transmission ratio change, which occurs at the start of an initial Step 26. In Step 26, the CVT Automotive Stability System 10 initially operates in a Normal Driving Strategy State 28 wherein, as represented in FIG. 2 and for the sake of simplicity, the ratio of the normal driving strategy (i__V__strategy) is designated as ratio standard (i__V__soll).

In a next step, indicated as Step 30, the Electronic Transmission Control 14 detects whether the Automotive Stability Computer 12 is in active engagement or is disengaged. Upon detection of the active automotive stability control (Automotive Stability Computer 12 active), when a Engagement Signal 18 indicating the active engagement has been passed on to the Electronic Transmission Control 14, the CVT Automotive Stability System 10 enters a Step 32 (yes) wherein the CVT Automotive Stability System 10 is in a Frozen State 34 wherein the actual variator ratio (iV__ist) of the electronic transmission control is "frozen". At this stage i__V__soll=i__V__ist=constant applies.

Termination of the Frozen State 34 of the variator ratio, that is, termination of Step 32, is indicated by the Engagement Signal 18 of the Automotive Stability Computer 12 that shows the end of activation of the automotive stability control. As indicated in FIG. 2, the CVT Automotive Stability System 10 then returns from Step 32 to Step 30, whereupon if Step 30 detects that the Automotive Stability Computer 12 is not actively engaged (no), the CVT Automotive Stability System 10 goes to a Step 36. In Step 36 the CVT Automotive Stability System 10 determines whether the Electronic Transmission Control 14 and CVT 20 are in a State 38 wherein the actual current ratio conforms to a set or strategy ratio, that is, a normal ratio. If the CVT Automotive Stability System 10 is in State 38, the CVT Automotive Stability System 10 proceeds to Step 26. If the CVT Automotive Stability System 10 is in State 38 (yes), the CVT Automotive Stability System 10 returns to the start of Step 26. When the actual ratio diverges from the set ratio or strategy ratio (normal ratio) (no), the CVT Automotive Stability System 10 enters a Transition Function Step 40 and a Transition Function 42 ensues, which provides a comfortable passage to the "normal ratio", whereupon the CVT Automotive Stability System 10 returns to the start of Step 26.

According to the invention, the transition function is a function of the vehicle speed (v__Fzg) and variables equivalent to the driving speed such as the output rotational speed (n__AB), the existing actual ratio (i__V__ist) and the divergence thereof from the new set ratio of the normal driving strategy (i−__V).

In the CVT tip function with rigid gear steps, a ratio change stopped by the "freezing" of the variator ratio is resumed. In a CVT tip function with variable or sliding gear ratios, the "frozen" ratio value serves, according to the invention, as the basis for calculation of additional gear ratios.

As added variants within the scope of this invention, the method described can be implemented in a separate driving strategy computer or directly in the automotive stability control unit or other adequate control units.

What is claimed is:

1. A method to improve automotive stability control using an automotive stability computer with a continuously variable automatic transmission (CVT), said continuously variable transmission comprising at least one variator and an electronic transmission control computer to change a transmission ratio, comprising the steps of:

passing a signal having an indication of an active engagement to an electronic transmission control, coupling the automotive stability computer with the electronic transmission control using one of a controller area network (CAN) data line and a direct signal line, detecting an activation of an active automotive stability control from said signal, freezing an actual variator ratio (iV_ist) after said signal passes by the electronic transmission control, showing a termination of the actual variator ratio freezing by a second automotive stability computer signal, detecting an end of the activation of the automotive stability control using said second signal, comparing the actual variator ratio to a strategy ratio to determine a divergence, applying a transmission function to the divergence to ensure a comfortable return to the strategy ratio.

2. The method of claim 1 further comprising the steps of:

calculating the transition function as a function of a vehicle speed (v_Fzg), variables equivalent to a driving speed, an actual variator ratio (i_V_ist), and the divergence ratio from a new set ratio of a normal driving strategy ($\Delta i\_V$).

3. The method of claim 1, wherein the transmission (CVT) further comprises gears and a tip function having rigid gear steps, said method further comprising the steps of:

resuming a speed ratio change stopped by the freezing of the variator ratio.

4. The method of claim 1, wherein the transmission (CVT) further comprises a tip function having one of variable and sliding gear steps, further comprising the steps of:

calculating at least one further ratio step using the frozen actual variator ratio.

5. A method to improve automotive stability control using an automotive stability computer with a continuously variable automatic transmission (CVT), said continuously variable transmission comprising at least one variator and an electronic transmission control computer to change a transmission ratio, said method comprising the steps of:

initiating a transmission ratio change by a signal from the transmission control computer;

initiating a stability control engagement by a signal from the stability computer during said transmission ratio change;

freezing an actual variator ratio (iV_ist) upon initiation of the control engagement; and terminating the freezing of the actual variator ratio upon termination of the stability control engagement, thereby eliminating a change of a rotary inertia caused by a transmission ratio change during said control engagement.

* * * * *